United States Patent
Stamm

(10) Patent No.: US 7,215,363 B2
(45) Date of Patent: May 8, 2007

(54) SYSTEM AND METHOD FOR SCANNING A SURFACE OF A MOVING OBJECT

(75) Inventor: Peter Stamm, Radolfzell (DE)

(73) Assignee: Siemens AG, München (DE)

( * ) Notice: Subject to any disclaimer, the term of this patent is extended or adjusted under 35 U.S.C. 154(b) by 700 days.

(21) Appl. No.: 10/345,489

(22) Filed: Jan. 17, 2003

(65) Prior Publication Data

US 2003/0142211 A1    Jul. 31, 2003

Related U.S. Application Data

(63) Continuation of application No. PCT/DE02/01735, filed on May 14, 2002.

(30) Foreign Application Priority Data

May 16, 2001 (DE) ................. 101 24 054

(51) Int. Cl.
*H04N 5/225* (2006.01)
*H04N 5/253* (2006.01)
*H04N 9/47* (2006.01)

(52) U.S. Cl. .................. 348/207.99; 348/91; 348/94; 348/139

(58) Field of Classification Search .......... 348/91, 348/94, 139, 207.99; 382/101–102, 107; 359/433; 235/462.01, 462.02, 462.14, 462.17, 235/462.23, 462.24, 470; 209/583

See application file for complete search history.

(56) References Cited

U.S. PATENT DOCUMENTS 4,920,255 A    4/1990   Gabeler 5,311,999 A  *  5/1994   Malow et al. .............. 209/583

(Continued)

FOREIGN PATENT DOCUMENTS

DE    19639854 A    6/1998

(Continued)

OTHER PUBLICATIONS

Derwent Abstract—DE19851284A1, May 11, 2000, Siemens AG, D-80333 München.

(Continued)

*Primary Examiner*—Vivek Srivastava
*Assistant Examiner*—James M. Hannett

(57) ABSTRACT

The present invention relates to a system and method for the imaging of surfaces of box like objects conveyed along a path. The objects are conveyed past at least one camera which is positioned at an angle to the object's surface. The at least one camera comprises a sensor array and zoom objective, the latter controlled by a control mechanism. The present system further comprises a control unit and at least one sensor. The sensor detects the location and velocity of an object. The data is conveyed to the control unit which further communicates with the control mechanism. The control unit causes the control mechanism to adjust the zoom on the objected so as to stay in constant focus with a passing surface of an object passing through the field of view of the at least one camera. After an object has passed through the field of view, the object is made to return to a home position.

22 Claims, 3 Drawing Sheets

U.S. PATENT DOCUMENTS

| | | | | |
|---|---|---|---|---|
| 5,534,684 | A | * | 7/1996 | Danielson .............. 235/472.02 |
| 6,102,291 | A | * | 8/2000 | Mazzone ............... 235/462.01 |
| 6,122,001 | A | * | 9/2000 | Micaletti et al. .............. 348/91 |
| 6,325,289 | B1 | * | 12/2001 | Mazzone ............... 235/462.14 |
| 6,752,318 | B2 | * | 6/2004 | Ishii .......................... 235/470 |

FOREIGN PATENT DOCUMENTS

| | | | |
|---|---|---|---|
| DE | 19851284 | A | 5/2000 |
| EP | 0462256 | B1 | 6/1994 |
| EP | 0796671 | A | 9/1997 |
| EP | 0926582 | A | 6/1999 |

OTHER PUBLICATIONS

Derwent Abstract—DE19639854A1, Jun. 10, 1998, ICTRONIC DR.-ING. Stein Bild. GmbH, D-65189 Wiesbaden.
Derwent Abstract—EP0796671A1; Sep. 24, 1997;Alcatel Postal Automation Systems, F-94250Gentilly Cedex.
Derwent Abstract—EP0462256B1;Jun. 22, 1994; Licentia Patent-Verw.-GmbH, D-60596 Frankfurt.
Derwent Abstract—JP 08248291; Sep. 27, 1996; Sony Corporation.
Derwent Abstract—JP02171883; Jul. 3, 1990; Nec Corporation.

* cited by examiner

SYSTEM AND METHOD FOR SCANNING A SURFACE OF A MOVING OBJECT

CROSS REFERENCE TO RELATED APPLICATIONS

The present application is a continuation of and claims priority to International Application number PCT/DE02/01735, filed May 14, 2002 and further claims priority to German patent application number 10124054.6, filed May 16, 2001, the both of which are herein incorporated by reference.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND OF THE INVENTION

The present invention relates to the filed of surface scanning or imaging and more particularly to a system and method for scanning an image of an object in motion, wherein said scan remains in focus despite the motion of the object. The object comprises a plurality of walls defining a substantially rectangular shape. Such objects may for example comprise mail pieces or parcels. Hereinbelow, the present invention will be discussed with respect to scanning a substantially rectangular parcel, however, application of the present invention is not limited to only this application, nor are objects, as used above, limited to only mail pieces or parcels. The above walls further comprise surfaces to be scanned. The surfaces may be characterized as leading and trailing as with respect to a direction of conveyance. A top or lateral surface of the parcel may also be subject to scanning, the lateral surface being substantially perpendicular to the leading and trailing surfaces, as well as lateral side surfaces abutting the aforementioned surfaces.

According to the present invention, the parcels are conveyed pass at least one camera's field of view. The conveyance is performed by a conveyor belt or the like and make occur at a constant or varying speed. Each of the at least one camera comprises an optoelectronic sensor array, such as a charged coupled device or CCD, a zoom objective including a fast adjustable zoom mechanism, and auto focus. Furthermore, at least one control unit is provided for effecting adjustment signals to the camera(s); and at least one sensor unit for determining a position of the parcels with respect to predetermined locations along the conveying path and in dependence of a particular path are used. The camera(s) are fixed above or on a lateral side of the path and parcels aligned and further diagonally to the respective parcel surface(s) to be recorded.

Parcels are automatically sorted and distributed according to distribution information located on the parcel surface. The distribution information may comprise receiver addresses or bar code information. The parcels are set out on the conveying path with a relatively high speed, for example 2 m/sec, and on occasion very small distances therebetween. Accordingly, they are directed past a device for picture recording which makes the recorded pictures available to an OCR reader.

Because it is unknown from the start on which surface of the parcel the distribution information is located, all parcel surfaces must to be recorded with an automatic system to ensure proper handling. In this regard, it is known from EP 462 256 B1 to record all six faces of a rectangular object. From below, the recording is effected with a CCD line camera active during overhead passage of the object. Herein the parcel bottom always has a defined position and distance with respect to the camera. The remaining exposed surfaces are recorded with surface cameras. Because the rectangular objects have relatively large surfaces, the respective surface cameras need to have a very high resolution in order to effectively read present distribution information (e.g. addresses). For such cameras, which are very expensive and typically not available, the reading process is carried out in two stages. First, the entire surface is recorded in a low resolution to determine the presences of an address. Subsequently, in a second stage, only the address is scanned in a high resolution.

In patent abstracts of Japan vol. 014, no. 438 (P-1108), Sep. 19, 1990 and JP 02 171883 A (NEC Corp.), Jul. 3, 1990, a device for picture recording of object surfaces having distribution information thereon is disclosed. Herein, a camera is aligned normally (vertically) to the object surface to be recorded. The camera contains a CCD sensor and a lens for shooting, with at least one sensor, the measurement of the heights of the objects. A control unit is provided for the production of regulating signals for the camera in dependence of the measured object height. Furthermore, transport means are provided for the continuous transport of square objects past the camera. The camera is equipped with a zoom objective having a fast zoom adjusting mechanism as a lens for shooting, and is further equipped with auto focus. The fast zoom adjusting mechanism is directed by the control unit in such a way that the image scale, independent of previously measured object heights, remains constant.

It is also known that the zoom adjusting mechanism contains a linear motor (patent abstracts of Japan vol. 1997, no. 01, Jan. 31, 1997 & JP 08 248291 A (Sony Corp.), Sep. 27, 1996).

If one wants to record the front and rear faces or surfaces of square objects, the surfaces approximately aligned to the transporting direction and follow one another in close succession, then the camera(s) have to be directed from above or lateral side so as to overcome obstructed views from neighboring objects. For this task, very expensive zonal cameras with a high pixel number or line cameras are used, although image distortions and modifications of the resolution can occur. As such a need exists for a less expensive and effective system and method for scanning an object surface.

SUMMARY OF THE INVENTION

The present invention addresses the above and other needs. An aim and advantage of the present invention is directed to wide application with relatively generic picture recording equipment. The application is directed to scanning or imaging of surfaces of rectangular objects, in motion, and relatively free from distortion. Line cameras specially arranged and applied herein may be used.

These and other advantages are achieved by a system for generating an object surface image of an object being conveyed along a path, comprising: at least one camera, positioned at an angle to said surface, said camera comprising an optoelectronic sensor, control mechanism, and zoom objective, whose focus is adjustably controllable by said control mechanism; at least one sensor positioned along said path for determining location and velocity of said object with respect to said path and camera; a control unit in electrical communication with said control mechanism and sensor such that said control unit causes said zoom objective to focus and adjust to remain in focus to said surface as said object moves through said camera's field of view.

These and still other advantages are achieved by a method for scanning an object surface being conveyed along a path, comprising the steps of: positioning at least one camera proximate to said path, such that said path runs in said at least one camera's field of view, said proximate to said path, such that said path runs in said at least one camera's field of view, said camera comprising an autofocus, zoom objective and sensor array; determining a velocity of said object and time said object will intersect a select location along said path; adjusting a focus of said zoom objective such that said surface remains in constant focus while said surface remaining in motion, said adjusting dependent upon at least said velocity.

Other advantages and embodiments are discussed below.

By adjusting the zoom objective in accordance with the movement of the object past the camera, the scale of the moving scan or image lines and modified distances of the respective image lines between camera and image, become approximately identical for each line such that an undistorted picture is obtained.

In one embodiment, it is advantageous to align the opto-electronic line sensor substantially horizontally with respect to the object transportation path when the camera is positioned above the objects. Control of the zoom objective adjusting mechanism is effected in such a way that the front face in the moving direction, starting at the lower edge, and the rear face in moving direction, starting at the upper edge, may be effectively recorded. It is accordingly advantageous to control the zoom objective in such a way that the surface of the object is additionally scanned. Blurring normally associated with cameras at off set angles is thereby avoided given the actual aligned orientation of the sensor array despite that of the camera.

It is also advantageous to align the opto-electronic line sensor vertically to an object transportation path when scanning with a camera positioned along the side of object and to control the adjusting mechanism of the zoom objective in such a way that the front face in the moving direction, starting at the vertical edge which is opposite to the camera, and the rear face in moving direction, starting at the vertical edge which is facing the camera, are recorded. Additionally, the zoom objective can be controlled in such a way that the collateral surface, which is directed to the camera, can also be scanned.

It is yet another advantage to place the line sensor in the camera diagonally to the objective level in such a way that the line sensor level lies approximately vertical or parallel to the surface of the object to be recorded and substantially perpendicular to the conveyance path.

With the vertical arrangement, a Scheimp condition (greater thickness of field) is more likely to be observed than at a parallel arrangement. The overlapping of the fringe ranges for the recorded surface lines, occurring without the inclination of the line sensor in the camera, is eliminated by at least the orientation of the sensor array, so that the resolution is maintained at a frontal recording. To avoid variations of distortion freedom at the edges of the surfaces to be recorded, it is advantageous to start the adjusting mechanism early and in particular to first reduce the speed so that the adjusting mechanism has the intended adjusting speed at the time of scanning of the entire surface.

It is also advantageous to control the adjusting mechanism in such a way that each scan of the surface of an object is performed at up to a maximum object height. A separate measurement of each object height is therefore unnecessary. Rather this information can be obtained from a log of recent measurements, with the selection of the highest height recently recorded. A control of up to each height of the object is also possible if the information of the height of the object is available. This may be obtained by an appropriate sensor arrangement.

For better adjustment to local conditions, it is also advantageous to fold the beam path of the camera with a mirror so that the placement of the camera may vary.

To receive an illumination of the recording field, it is further advantageous to place an illumination device in the beam path of the camera, proximate to the object if desired, in which center may be placed a deviation mirror. This redirects the camera beams to the camera which are not in the beam path of the illumination device. The illumination beam therefore gets to the surface to be recorded mostly clear of obstacles. The spectrum of illumination may be selected so as to coincide with particular applications and cameras to be used.

BRIEF DESCRIPTION OF THE SEVERAL VIEWS OF THE DRAWINGS

The novel features and method steps believed characteristic of the invention are set out in the claims below. The invention itself, however, as well as other features and advantages thereof, are best understood by reference to the detailed description, which follows, when read in conjunction with the accompanying drawing, wherein:

DETAILED DESCRIPTION OF THE INVENTION

Figure 1:
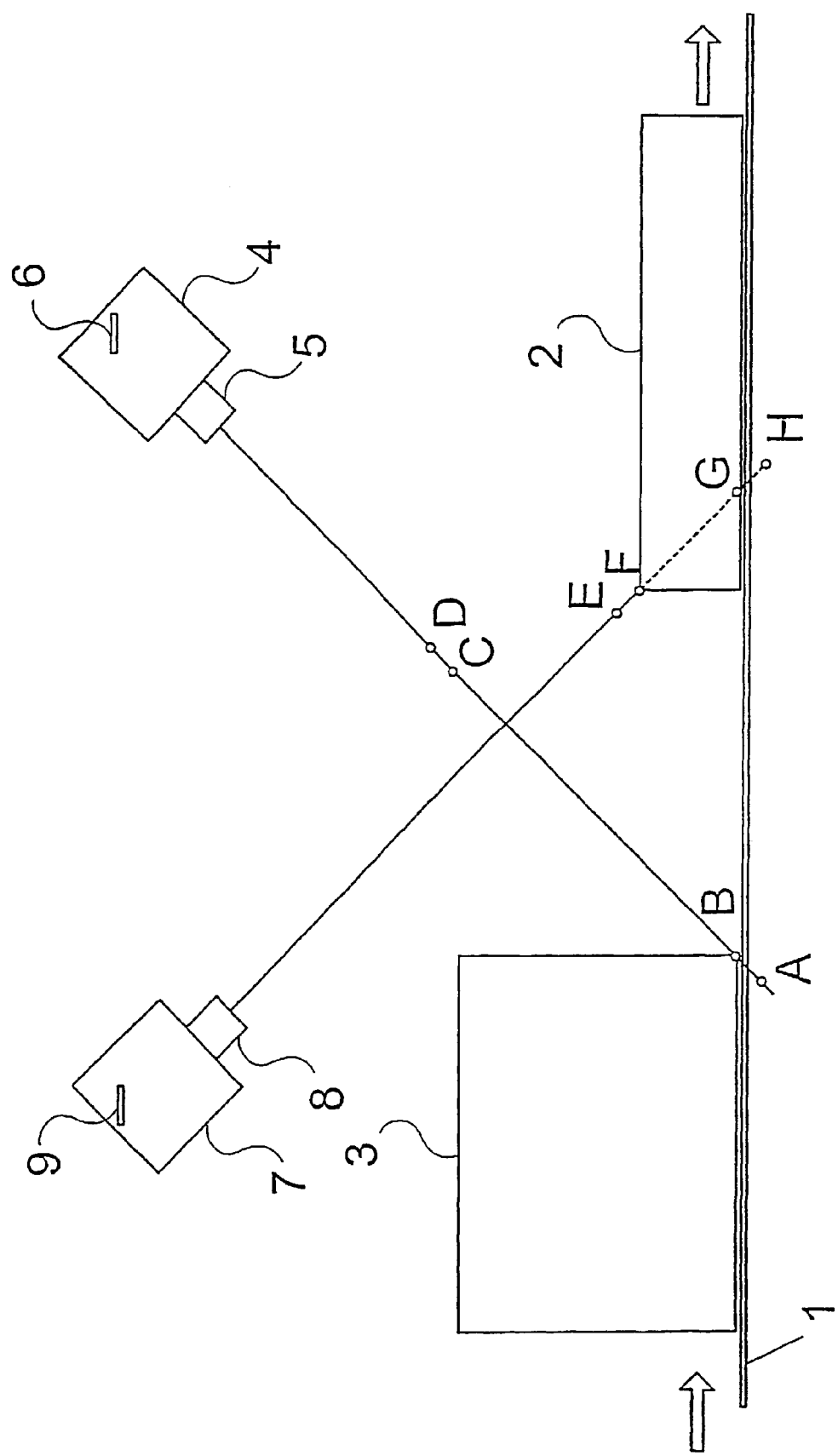
FIG. 1 depicts a schematic side-view of a device for image recording.

As depicted in FIG. 1, conveying path 1, which may comprise a conveying belt, transports square objects 2, 3 from left to right (arrow) at a predetermined minimum spacing and relatively constant speed. As discussed above, the objects may comprise mail parcels, although application of the invention is no so limited. For purposes of discussion, the objects will be hereinafter referred to as parcels.

Two cameras 4, 7 are positioned above conveying path or belt 1. Each of the cameras comprise: a zoom objective 5, 8 with adjusting mechanism; and an opto-electronic sensor array 6, 9. The sensor array may comprise a charged coupled device or CCD array. A front/first camera 4 (with respect to the transporting direction) faces downward at approximately 45° to the front surfaces or faces of the parcels. A rear camera 7 (with respect to the transporting direction) also faces downwards at approximately 45° to the rear surfaces or faces of parcels 2, 3. It is especially useful for effective control of cameras 2, 3 to know the location and time of arrival of the parcels at that location. To this end, a light barrier and a momentum transmitter, as known in the art, are implemented.

The light barrier detects the passage of the front and rear edges of the parcels at select locations. With the aid of the momentum transmitter, which detects the movements of the conveying belt 1, it can be precisely determined, when lower edges—pos. B—of the front faces of the parcels 2, 3, appear in the beam path or field of view of the front camera 4 and when the upper edges—pos. F—of the rear faces of the square objects appear in the beam path of the rear camera 7. The zoom objective of the cameras is thus made to adjust to the velocity and location of the parcels, so that as the parcels pass the cameras' field of view, the zoom objective remains in focus to the surface to be scanned or imaged.

Around the time of the acceleration of the zoom movement from 0 to the adjusting speed, the starting point—pos. A, E—of the adjusting mechanism of the determined times above has to be advanced. Should the adjusting path be kept as short as possible, i.e. should the adjustment of the zoom objectives 5, 8 occur only during the scanning of the respective front and rear faces, the height of the scanned parcel (herein parcels 2, 3) must be known in advance. This facilitates knowledge of velocity, adjustment and end points. This can be facilitated by an appropriate sensor envisioned by one skilled in the art, including a light barrier line, laser sensor and the like. With this, the precise time can be determined when the upper edge of the front face leaves the beam path of the front camera 4 and when the upper edge of the rear face—pos. F—enters into the beam path of the rear camera 7. Accordingly, the time of the speed reduction of the adjustment of the zoom objective 5 of the front camera 4 at pos. C, and by adding the acceleration time of the starting time according to pos. A of the adjustment of the zoom objective 8 of the rear camera 7, are defined.

If the height of the square object 2, 3 is not measured, then the adjusting path of the zoom objective has to be laid out for each object uniformly at one height which corresponds to at least the height of the largest parcel as appears in a log of recent object height determinations. The log would be electronically stored and accessible as would be known to one skilled in the art.

Figure 2:
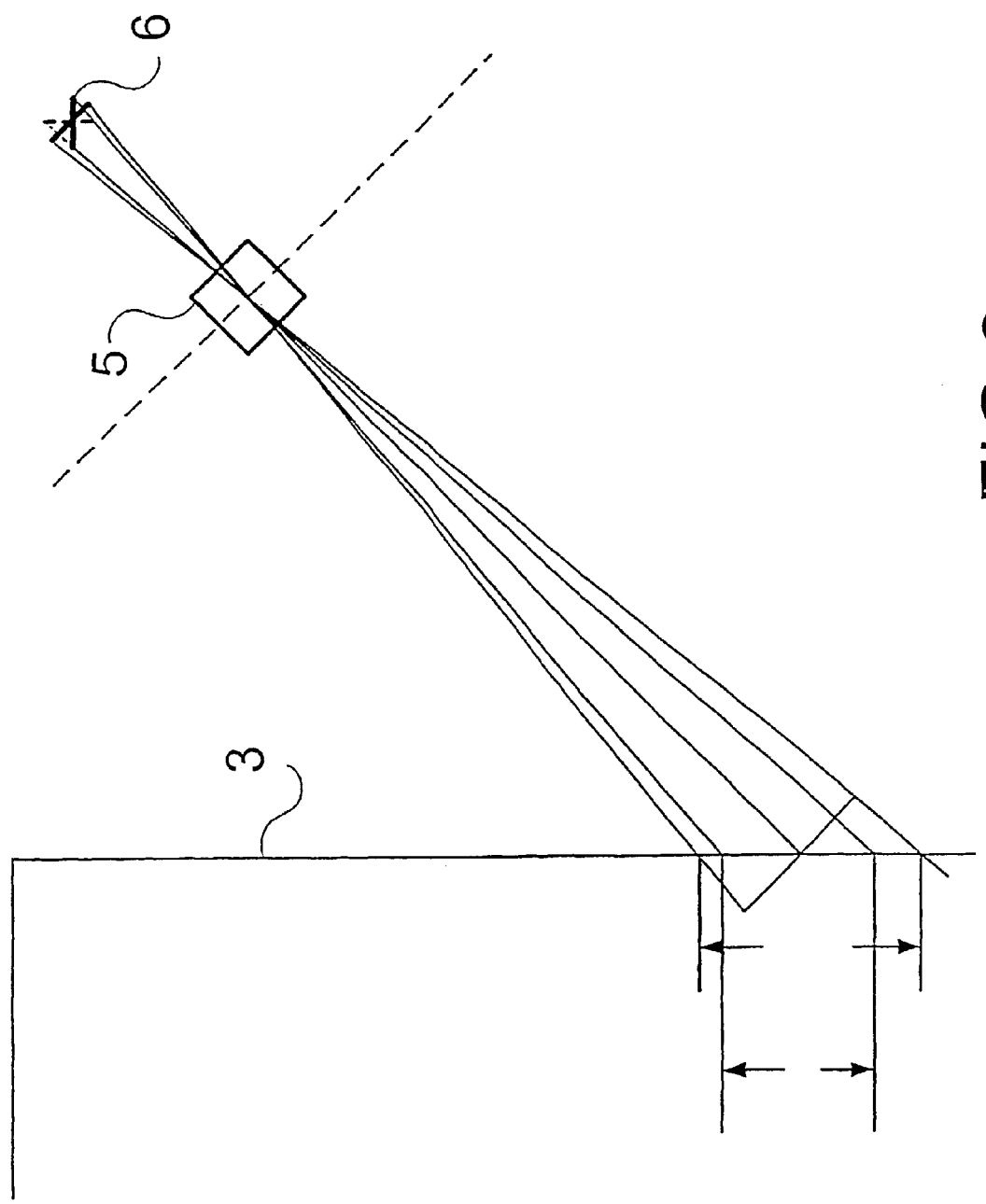
FIG. 2 depicts a beam path.

As is depicted in FIG. 2, a camera positioned at an angle to the scanned surface has a thicker scan line than a camera substantially perpendicular to the surface. With angled cameras, the risk of overlapped images, blurrings and distortions is greater than with substantially perpendicularly oriented cameras. To avoid the aforementioned image problems and to obtain a resolution comparable with a non-diagonal inclined camera, the CCD sensor level is inclined with respect to the camera so as to be normal or face the surface to be scanned despite the orientation of the camera housing the CCD. Accordingly, the scan line maintains a thickness equal to that achieved by a perpendicularly oriented camera. In addition, by continuously adjusting the zoom focus to relatively match the acceleration of the parcel being scanned, the entire scanned surface remains in a sufficient usable focus. Hence, the simulation of the perpendicular scan with a non-perpendicularly oriented camera.

Figure 3:
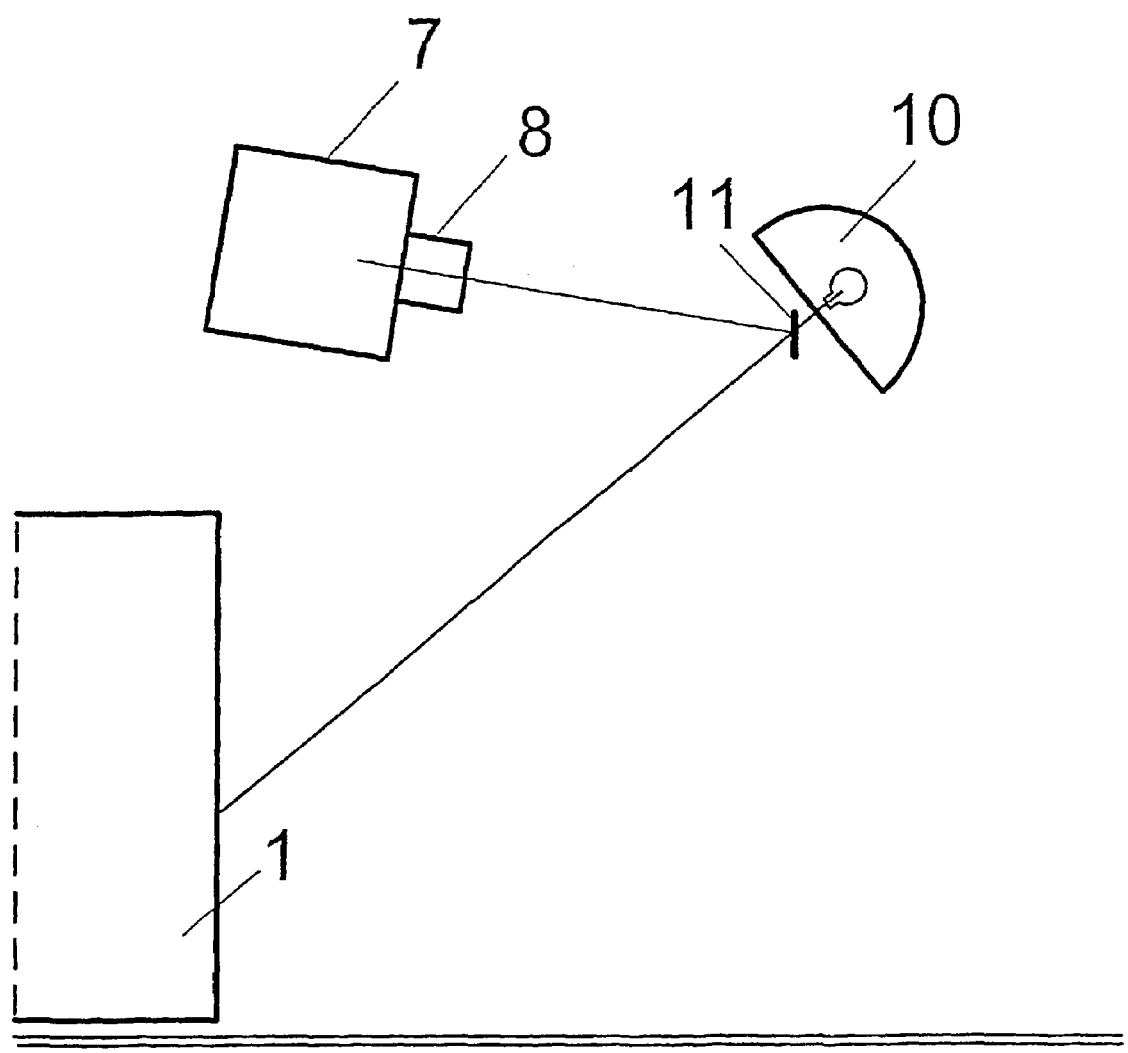
FIG. 3 depicts a schematic side-view with illumination.

The inclination of the sensor, parallel to the surface of the parcel is also possible only if there is a slightly decreased focus of the scan line thickness. This is depicted in FIG. 3. For illumination purposes, a mirror headlight 10 is introduced. The illumination provides a select and/or constant source of parcel illumination. The headlight is located in the camera beam path and proximate to the parcel. While depicted and described as a headlight, the illumination means for the present invention may comprise any suitable illumination source. As depicted, mirror headlight 10 is not covered by camera 7. Rather, at the approximate center of the mirror headlight 10, a relatively small deviation mirror is placed which deflects incident beams towards and away from camera 7. Accordingly, the camera may be positioned in practically any location with respect to a parcel. After scanning, the control mechanism may cause the zoom objective to return to a home position in preparation for a subsequent scan.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A system for generating an image of an object being conveyed along a path, comprising:
   at least one camera configured to record an image of at least one of leading and trailing surfaces of objects, and positioned at an angle to said object surface to be recorded, said at least one camera comprising a sensor array, control mechanism, and zoom objective, whose focus is adjustably controllable by said control mechanism;
   at least one sensor positioned along said path for determining location and velocity of said object with respect to said path and said at least one camera; and
   a control unit in electrical communication with said control mechanism and sensor such that said control unit causes said zoom objective to focus and adjust to remain in focus with said surface to be recorded as said object moves through said at least one camera's field of view,
   wherein the sensor array is mounted so that a light receiving sensor side extends in a plane that is substantially perpendicular to said object surface to be recorded; and
   wherein a camera line of focus is not perpendicular to said object surface to be recorded.

2. The system according to claim 1, wherein said zoom objective is made to return to a home position by said control mechanism after said surface has passed through said field of view.

3. The system according to claim 1, wherein said sensor array is an optoelectronic sensor.

4. The system according to claim 1, wherein said angle is approximately 45 degrees.

5. The system according to claim 1, wherein said sensor tray is sensitive to radiation in the visible spectrum.

6. The system according to claim 1, wherein said object comprises six walls defining a substantially rectangular shape.

7. The system according to claim 1, wherein said object is a mail piece.

8. The system according to claim 1, wherein:
   said camera comprises a plurality of cameras;
   sensor arrays within said plurality of cameras are substantially parallel to said path;
   said plurality of cameras are positioned above said path; and
   control units of said plurality of cameras engage control mechanisms of said plurality of cameras to record leading and trailing surfaces of objects starting at upper and lower surface edges, respectively.

9. The system according to claim 1, wherein:
   said camera comprises a plurality of cameras;
   sensor arrays within said plurality of cameras are substantially parallel to said path;
   said plurality of cameras are positioned along a lateral side of said path; and
   control units of said plurality of cameras engage control mechanisms of said plurality of cameras to record leading and trailing side surfaces of objects starting at a vertical edge of said surfaces.

10. The system according to claim 1, wherein said at least one camera records in focus up to a maximum object height, said height determined prior to scanning.

11. The system according to claim 1, wherein said at least one camera records in focus up to maximum object height, said height comprising a highest recorded value of a select history of object scans.

12. The system according to claim 1, further comprising a mirror placed in said field of view such that said mirror reflects light incident between said at least one camera and said object.

13. The system according to claim 12, wherein said mirror further comprises illumination means associated with said mirror, said illumination means facilitating illumination of said object.

14. The system according to claim 13, wherein said illumination means is positioned at the approximate center of said mirror.

15. A method for scanning an image of an object being conveyed along a path, comprising the steps of:
    positioning at least one camera proximate to said path, such that said path runs in said at least one camera's field of view, said at least one camera configured to record an image of at least one of leading and trailing surfaces of objects, and comprising an autofocus, zoom objective and sensor array;
    arranging the sensor array so that a light-receiving sensor array plane is substantially perpendicular to said object surface, and a camera line of focus is not perpendicular to said object surface;
    determining a velocity of said object and time said object will intersect a select location along said path; and
    adjusting a focus of said zoom objective such that said surface remains in constant focus while said surface remains in motion past said selection location, said adjusting dependent upon at least said velocity and location of said object along said path.

16. The method according to claim 15, wherein said step of adjusting further depends upon a height of said object.

17. The method according to claim 15, wherein said height is determined for each object to be scanned.

18. The method according to claim 15, wherein said object comprises six walls defining a substantially rectangular shape.

19. The method according to claim 15, wherein said object is a mail piece.

20. The method according to claim 15, wherein said height is taken from a history log of a select number of past recorded object heights, said height comprising a highest height appearing in said log.

21. The method according to claim 20, wherein said at least one camera comprises a plurality of cameras and wherein said step of positioning further comprises the steps of:
    arranging sensor arrays within said plurality of cameras to be substantially parallel to said path;
    positioning said plurality of cameras above said path; and
    engaging control units of said plurality of cameras to further engage control mechanisms of said plurality of cameras to record leading and trailing surfaces of objects starting at upper and lower surface edges, respectively.

22. The method according to claim 20, wherein said at least one camera comprises a plurality of cameras and wherein said step of positioning further comprises the steps of:
    arranging sensor arrays within said plurality of cameras to be substantially parallel to said path;
    positioning said plurality of cameras along a lateral side of said path; and
    engaging control units of said plurality of cameras to further engage control mechanisms of said plurality of cameras to record leading and trailing side surfaces of objects starting at a vertical edge of said surfaces.

* * * * *